(12) United States Patent
Zeng et al.

(10) Patent No.: US 11,143,558 B2
(45) Date of Patent: Oct. 12, 2021

(54) METHOD AND SYSTEM FOR MEASURING TRANSIENT TIME WIDTH OF ULTRASHORT PULSE

(71) Applicants: Chongqing Institute of East China Normal University, Chongqing (CN); East China Normal University, Shanghai (CN)

(72) Inventors: Heping Zeng, Chongqing (CN); Ming Yan, Chongqing (CN); Yinqi Wang, Chongqing (CN); Xiaoyue Wang, Chongqing (CN)

(73) Assignees: CHONGQING INSTITUTE OF EAST CHINA NORMAL UNIVERSITY, Chongqing (CN); EAST CHINA NORMAL UNIVERSITY, Shanghai (CN)

( * ) Notice: Subject to any disclaimer, the term of this patent is extended or adjusted under 35 U.S.C. 154(b) by 0 days.

(21) Appl. No.: 16/895,550

(22) Filed: Jun. 8, 2020

(65) Prior Publication Data

US 2021/0072089 A1 Mar. 11, 2021

(30) Foreign Application Priority Data

Sep. 11, 2019 (CN) .......................... 201910859995.X

(51) Int. Cl.
*G01J 11/00* (2006.01)
(52) U.S. Cl.
CPC ..................................... *G01J 11/00* (2013.01)
(58) Field of Classification Search
CPC ................ G01J 11/00; G01J 1/0414
See application file for complete search history.

(56) References Cited

U.S. PATENT DOCUMENTS

2006/0088259 A1* 4/2006 Weiner ..................... G01J 11/00
385/122
2012/0093519 A1* 4/2012 Lipson ..................... G01J 11/00
398/157
(Continued)

FOREIGN PATENT DOCUMENTS

CN 101699233 4/2010
CN 208537036 2/2019

OTHER PUBLICATIONS

SIPO, First Office Action for CN Application No. 201910859995.X, dated Aug. 11, 2020.

*Primary Examiner* — Manuel L Barbee
(74) *Attorney, Agent, or Firm* — Hodgson Russ LLP

(57) ABSTRACT

Provided are a method and a system for measuring a transient time width of an ultrashort pulse in real time. The method includes: performing an interaction of a laser pulse to be measured with a linear chirped pulse in a second-order non-linear medium, to generate a sum-frequency beam, wherein an intensity sag occurs in the chirped pulse after the interaction; performing a time spreading by a time stretching system on the chirped pulse with the intensity sag; detecting the spread chirped pulse with the spread intensity sag by a photoelectric detector, and measuring and recording a time width τ' of the spread intensity sag by an oscilloscope; and obtaining the transient time width τ of the laser pulse to be measured according to a formula of τ=τ'/M, where M is an amplification coefficient of the time stretching system.

9 Claims, 1 Drawing Sheet

(56) References Cited

U.S. PATENT DOCUMENTS

2015/0070705 A1* 3/2015 Kim .................. G01J 11/00
356/450
2020/0292382 A1* 9/2020 Yu .................... G01J 1/0414

* cited by examiner

METHOD AND SYSTEM FOR MEASURING TRANSIENT TIME WIDTH OF ULTRASHORT PULSE

CROSS-REFERENCE TO RELATED APPLICATIONS

This application claims priority to Chinese Patent Application Serial No. 201910859995.X, filed on Sep. 11, 2019, the entire contents of which is incorporated herein by reference.

FIELD

The present disclosure relates to an ultrafast laser technology field, and more particularly to a method and a system for measuring a transient time width of an ultrashort pulse.

BACKGROUND

Ultrashort laser pulses provide an ideal light source for the study of ultrashort physical phenomena, the exploration of basic physics such as chemical molecule energy level structure and the application of industrial processing. A pulse width of the ultrashort laser pulse is extremely narrow, which has only a few picoseconds ($10^{-12}$ s) and even reaches the femtosecond order ($10^{-15}$ s). The pulse width can achieve extremely high peak power density, so it can be used to reveal the internal microdynamics and ultrafast time evolution process of matter. However, scientific research based on femtosecond pulses (such as femtosecond chemistry, ultrafast nonlinear optics, etc.) is based on the premise of accurate or even high-speed measurement of pulse time width.

Although there are many methods to measure the pulse width of ultrashort laser, there are some shortcomings in the real-time high-speed measurement of pulse width.

SUMMARY

The present disclosure aims to solve at least one problem in the related art to at least some extent.

In a first aspect, embodiments of the present disclosure provide a method for measuring a transient time width of an ultrashort pulse in real time. The method includes:

performing an interaction of a laser pulse to be measured with a linear chirped pulse in a second-order non-linear medium, to generate a sum-frequency beam, wherein an intensity sag occurs in the chirped pulse after the interaction;

performing a time spreading by a time stretching system on the chirped pulse with the intensity sag;

detecting the spread chirped pulse with the spread intensity sag by a photoelectric detector, and measuring and recording a time width $\tau'$ of the spread intensity sag by an oscilloscope; and obtaining the transient time width $\tau$ of the pulse to be measured according to a formula of $\tau=\tau'/M$, where M is an amplification coefficient of the time stretching system.

In a second aspect, embodiments of the present disclosure provide a system for measuring a transient time width of an ultrashort pulse in real time. The system includes a laser, a beam splitter, a time delayer, a first reflecting mirror, a half-wave plate, a second reflecting mirror, a third reflecting mirror, a first coupler, a fiber, a second coupler, a beam combiner, a lens, a sum-frequency crystal, a time stretching system, an photoelectric detector, and an oscilloscope. The laser is configured to generate an ultrashort pulse to be measured. The beam splitter is configured to split the ultrashort pulse into two beams, wherein one beam is configured to pass through the third reflecting mirror, the first coupler, the fiber, and the second coupler in sequence to generate the chirped pulse, and the other beam is configured to pass through the first reflecting mirror, the time delayer, the half-wave plate and the second reflecting mirror in sequence, for enabling the two beams to have consistent polarization and time coincidence, and after passing through the beam combiner, the ultrashort pulse to be measured and the chirped pulse are focused by the lens to the sum-frequency crystal. The sum-frequency crystal is configured to perform an interaction of the ultrashort pulse to be measured with the chirped pulse, to generate a sum-frequency beam, in which an intensity tag occurs in the chirped pulse after the interaction. The time stretching system is configured to perform time spreading on the chirped pulse with the intensity sag. The photoelectric detector is configured to detect the spread chirped pulse with the spread intensity sag. The oscilloscope is configured to measure a time width $\tau'$ of the spread intensity sag, for calculating the transient time width $\tau$ of the ultrashort pulse to be measured according to a formula of $\tau=\tau'/M$, where M is an amplification coefficient of the time stretching system.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings as described below, in which.

EMBODIMENTS OF THE PRESENT DISCLOSURE

The present disclosure will be further described in detail below with reference to the accompanying drawings and embodiments. Same or similar reference numbers throughout the specification indicate same or similar elements or element having same or similar functions. It should be understood that the specific embodiments described herein are only used to explain the present disclosure, and should not be understood as limitation to the present disclosure.

In the following, a method and a system for measuring a transient time width of an ultrashort pulse in real time according to embodiments of the present disclosure will be described in detail with reference to drawings.

Figure 1:
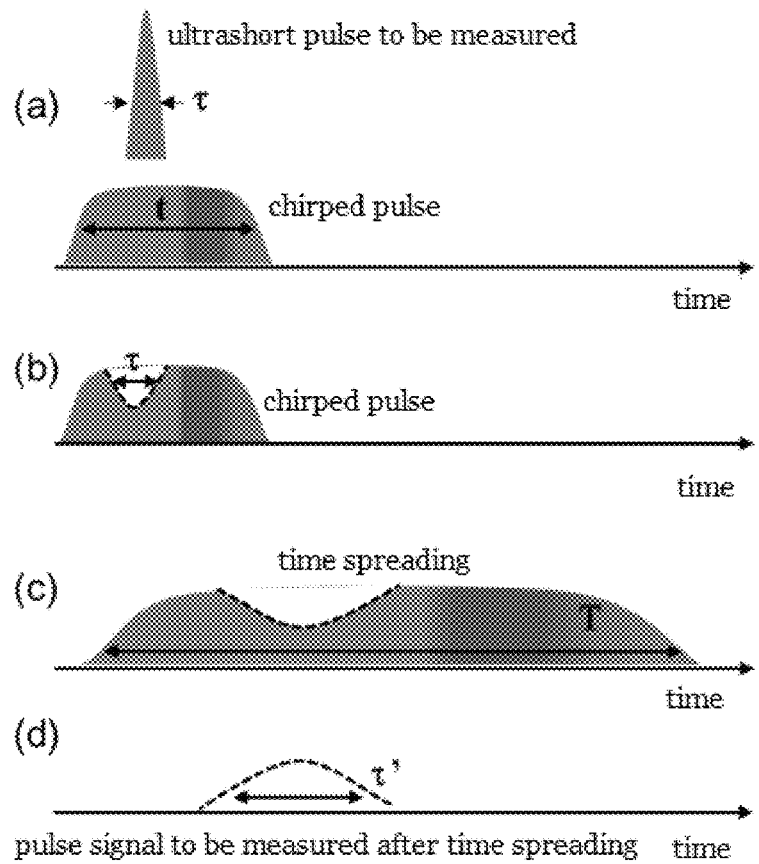
FIG. 1 is a schematic diagram illustrating a process of measuring a transient time width of an ultrashort pulse according to an embodiment of the present disclosure.

FIG. 1 illustrates a process of measuring a transient time width of an ultrashort pulse in real time according to an embodiment of the present disclosure. The process includes the following: performing an interaction of a pulse to be measured with a linear chirped pulse in a second-order non-linear medium, to generate a sum-frequency beam, in which an intensity sag occurs in the chirped pulse after the interaction; performing a time spreading by a time stretching system on the chirped pulse with the intensity sag; detecting the spread chirped pulse with the spread intensity sag by a photoelectric detector, and measuring and recording a time width τ' of the spread intensity sag by an oscilloscope; and obtaining the transient time width τ of the pulse to be measured according to a formula of τ=τ'/M, where M is an amplification coefficient of the time stretching system.

In the present disclosure, when an ultrashort pulse is transmitting in dispersive medium (such as optical fiber), due to the dispersion effect, high-frequency components in the pulse move towards a leading edge of the pulse (or move backwards), and low-frequency components in the pulse move towards a lagging edge of the pulse (or move forwards), thereby generating the chirped pulse.

For the linear chirped pulse, the carrier frequency in the pulse envelope has a linear distribution under the group-velocity dispersion effect.

The time spreading refers to an optical pulse chirping process with strong linear dispersion effect.

In detail, after passing through a section of dispersive medium having the group-velocity dispersion of D (for example, a single-mode fiber of 5 kilometers), the pulse width oft is stretched in the time dimension under the dispersion effect, and the pulse width T of the pulse after stretching is $$T = t\sqrt{1 + \left(4\ln2\frac{D}{t^2}\right)^2}.$$

In this case, the pulse is stretched in the time domain, and the shape of the pulse is amplified to a large dime dimension T from a small time dimension t, where the amplification coefficient is M=T/t. In general, M=$10^3$ (for example, t= $10^{-11}$ s, T=$10^{-8}$ s).

After the interaction of the chirped pulse with the pulse to be measured, a part of energy thereof is transferred to the sum-frequency beam, and therefore one sag occurs therein. To a certain extent, the time width of the sag has a one-to-one relationship with the pulse width of the pulse to be measured. Since the time dimension is in the femtosecond order or below, the sag cannot be directly detected by the photoelectric detector. The time stretching system may perform time spreading on the chirped pulse with the sag. At this time, the spread sag can be detected by the detector together with the chirped pulse, and recorded by the oscilloscope. The time width τ' of the sag at this time is measured, and according to amplification coefficient M, the transient time width τ of the pulsed to be measured may be obtained τ=τ'/M.

Here, the fast intensity change (for example, the intensity sag in femtosecond order, $10^{-12}$ s) would modulate the spectrum of the chirped pulse itself, resulting in nonlinear deformation of the chirped pulse. However, since the sum-frequency efficiency of the nonlinear crystal is limited (for example, <10%), the generated sag is significantly less than the intensity of the chirped pulse. Therefore, the pulse deformation introduced by this fast intensity change may be ignored.

In principle, if the time resolution of the detector and the oscilloscope is $T_R$, under the action of the amplification coefficient M, the minimum value (or resolution) of the original pulse width that can be detected by the present solution is $t_R$, $$t_R = T_R/M.$$

Take the photoelectric measurement system with the time resolution of 100 ps as an example, the measurement resolution that can be obtained by the method of the present disclosure is 100 fs.

Figure 2:
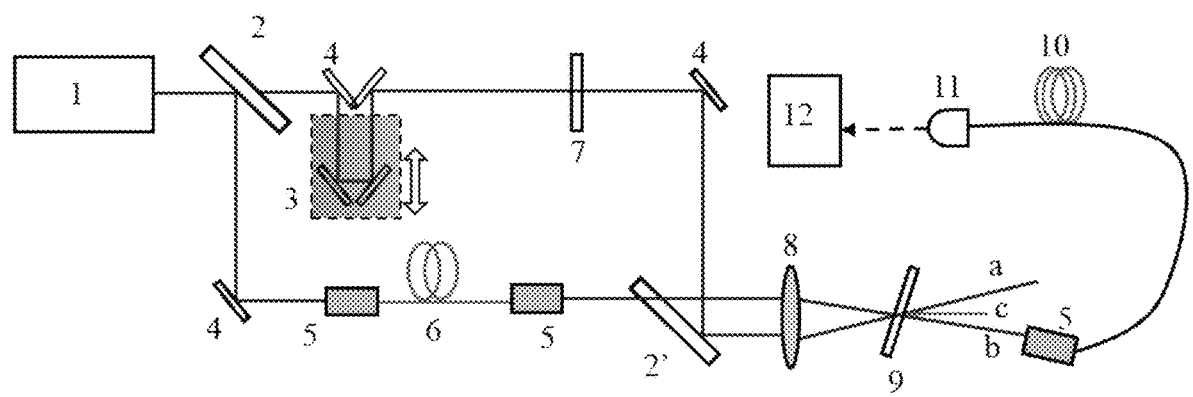
FIG. 2 is a schematic diagram of a system for measuring a transient time width of an ultrashort pulse according to an embodiment of the present disclosure.

In order to achieve the above method, embodiments of the present disclosure provide a system for measuring a transient time width of an ultrashort pulse in real time. As illustrated in FIG. 2, the system includes a laser 1, a beam splitter 2, a time delayer 3, reflecting mirrors 4, optical fiber couplers 5, a fiber 6, a half-wave plate 7, a beam combiner 2', a focusing lens 8, a sum-frequency crystal 9, a single mode fiber system 10, an photoelectric detector 11 and an oscilloscope 12.

The laser 1 is configured to generate a laser pulse to be measured. The laser 1 may be a mode-locked fiber laser, and may have following parameters: the repetition frequency is 100 MHz, the central wavelength is 1030 nm, the average output power is 100 mW, and the pulse width is 2 ps.

The beam splitter 2 is configured to the split the laser pulse into two beams. One beam passes through the reflecting mirror 4, one coupler 5, the single mode polarization-maintaining fiber 6 and another coupler 5 in sequence, generating the chirped pulse. The other beam passes through the reflecting mirror 4, the time delayer 3, the half-wave plate 7 and another reflecting mirror 4 in sequence. With the delayer and the half-wave plate, the delay and the polarization of the beam is adjusted, such that the two beams have consistent polarization and time coincidence. After passing through the beam combiner 2', the two beams are focused to the sum-frequency crystal 9 by the lens 8 (the focus length of the lens 8 may be 5 cm). The two beams (chirped pulse b and the pulse to be measured a) generate the sum-frequency beam c in the crystal. In this process, the energy of the chirped pulse b at the place where the chirped pulse b coincides with the pulse to be measured a is transferred to the sum-frequency beam c, and thus an intensity sag occurs in the chirped pulse b. The chirped pulse with the sag is injected into the single mode fiber system 10 (i.e., time stretching system) having the length of 500 m after passing through the coupler, and then detected by the detector 11. The detected signal is recorded by the oscilloscope 12. The responsive bandwidth of the detector 11 is 40 GHz, the bandwidth of the oscilloscope 12 is 33 GHz, and the sampling frequency of the oscilloscope 12 is 80 GS/s. The time width of the sag measured by the oscilloscope is τ', then the width τ of the pulse to be measured is τ=τ'/M, where M is an amplification coefficient of the time stretching system, and is calculated according to the time width t of the chirped pulse before passing through the time stretching system and the time width T of the chirped pulse after passing through the time stretching system (M=T/t).

With the present disclosure, it does not need the complex optical and circuit structure to obtain the real-time and continuous transient information of the ultrashort pulse. Moreover, the update speed of the measurement is fast, and the pulses of high repetition frequency can be measured one by one. Therefore, the present disclosure provides a method and system to overcome the limitation of the sampling speed and bandwidth of electronic equipment and realize the continuous, ultra-fast and frame-by-frame acquisition of optical signals, providing a new high-speed and high-time-resolution technical approach for the basic research of ultra-fast laser and the development of new technologies.

Although explanatory embodiments have been shown and described, it would be understood that above embodiment are exemplary, and shall not be understood as limitation to the present disclosure, and it would be appreciated by those skilled in the art that changes, alternatives, and modifications may be made in the embodiments within the scope of the disclosure.

What is claimed is:

1. A method for measuring a transient time width of an ultrashort pulse in real time, comprising:
performing an interaction of a laser pulse to be measured with a linear chirped pulse in a second-order non-linear medium, to generate a sum-frequency beam, wherein an intensity sag occurs in the chirped pulse after the interaction;
performing a time spreading by a time stretching system on the chirped pulse with the intensity sag;
detecting the spread chirped pulse with the spread intensity sag by a photoelectric detector, and measuring and recording a time width $\tau'$ of the spread intensity sag by an oscilloscope; and
obtaining the transient time width $\tau$ of the laser pulse to be measured according to a formula of $\tau=\tau'/M$, where M is an amplification coefficient of the time stretching system.

2. The method of claim 1, wherein performing the time spreading comprises:
stretching a pulse width t of the chirped pulse to a large time dimension T with a section of dispersive medium having a group-velocity dispersion of D:

$$T = t\sqrt{1 + \left(4\ln 2 \frac{D}{t^2}\right)^2},$$

where, M=T/t.

3. The method of claim 1, wherein the intensity sag is generated due to a part of energy of the chirped pulse transferring to the sum-frequency beam after the interaction, and a time width of the intensity sag has a one-to-one relationship with the laser pulse to be measured.

4. The method of claim 3, wherein a carrier frequency in an envelope of the linear chirped pulse has a linear distribution under the group-velocity dispersion.

5. The method of claim 3, wherein the pulse to be measured is generated by a pulse laser having a repetition frequency greater than $10^6$ Hz.

6. A system for measuring a transient time width of an ultrashort pulse in real time, comprising a laser, a beam splitter, a time delayer, a first reflecting mirror, a half-wave plate, a second reflecting mirror, a third reflecting mirror, a first coupler, a fiber, a second coupler, a beam combiner, a lens, a sum-frequency crystal, a time stretching system, an photoelectric detector, and an oscilloscope, wherein
the laser is configured to generate an ultrashort pulse to be measured;
the beam splitter is configured to split the ultrashort pulse into two beams, wherein one beam is configured to pass through the third reflecting mirror, the first coupler, the fiber, and the second coupler in sequence to generate the chirped pulse, and the other beam is configured to pass through the first reflecting mirror, the time delayer, the half-wave plate and the second reflecting mirror in sequence, for enabling the two beams to have consistent polarization and time coincidence, and after passing through the beam combiner, the ultrashort pulse to be measured and the chirped pulse are focused by the lens to the sum-frequency crystal;
the sum-frequency crystal is configured to perform an interaction of the ultrashort pulse to be measured with the chirped pulse, to generate a sum-frequency beam, in which an intensity tag occurs in the chirped pulse after the interaction;
the time stretching system is configured to perform time spreading on the chirped pulse with the intensity sag;
the photoelectric detector is configured to detect the spread chirped pulse with the spread intensity sag;
the oscilloscope is configured to measure a time width $\tau'$ of the spread intensity sag, for calculating the transient time width $\tau$ of the ultrashort pulse to be measured according to a formula of $\tau=\tau'/M$, where M is an amplification coefficient of the time stretching system.

7. The system of claim 6, wherein the time stretching system is formed by a section of fiber, in which the fiber is configured to provide sufficient dispersion such that a pulse width is spread from femtosecond order to nanosecond order.

8. The system of claim 7, wherein the dispersion of the fiber is D, the pulse width of the chirped pulse is t, and the pulse width of the spread chirped pulse is T, $$T = t\sqrt{1 + \left(4\ln 2 \frac{D}{t^2}\right)^2},$$

where, M=T/t.

9. The system of claim 6, wherein the intensity sag is generated due to a part of energy of the chirped pulse transferring to the sum-frequency beam after the interaction, and a time width of the intensity sag has a one-to-one relationship with the laser pulse to be measured.

* * * * *